United States Patent
Ju et al.

(10) Patent No.: US 9,514,783 B2
(45) Date of Patent: *Dec. 6, 2016

(54) VIDEO EDITING WITH CONNECTED HIGH-RESOLUTION VIDEO CAMERA AND VIDEO CLOUD SERVER

(71) Applicant: Ambarella, Inc., Santa Clara, CA (US)

(72) Inventors: Chi Hong John Ju, Saratoga, CA (US); Didier LeGall, Los Altos, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,922

(22) Filed: Feb. 18, 2016

(65) Prior Publication Data

US 2016/0163353 A1    Jun. 9, 2016

Related U.S. Application Data

(63) Continuation of application No. 14/312,921, filed on Jun. 24, 2014, now Pat. No. 9,286,940, which is a continuation of application No. 13/710,725, filed on Dec. 11, 2012, now Pat. No. 8,768,142.

(60) Provisional application No. 61/590,919, filed on Jan. 26, 2012.

(51) Int. Cl.
| | |
|---|---|
| *G11B 27/031* | (2006.01) |
| *H04N 21/274* | (2011.01) |
| *H04N 21/4223* | (2011.01) |
| *H04N 21/472* | (2011.01) |
| *G11B 27/034* | (2006.01) |
| *H04N 1/00* | (2006.01) |
| *H04N 11/24* | (2006.01) |
| *H04N 21/2343* | (2011.01) |
| *H04N 21/2743* | (2011.01) |

(52) U.S. Cl.
CPC ........... *G11B 27/031* (2013.01); *G11B 27/034* (2013.01); *H04N 1/00244* (2013.01); *H04N 11/002* (2013.01); *H04N 21/23439* (2013.01); *H04N 21/234363* (2013.01); *H04N 21/274* (2013.01); *H04N 21/2743* (2013.01); *H04N 21/4223* (2013.01); *H04N 21/47205* (2013.01)

(58) Field of Classification Search
CPC ............... H04N 21/234363; H04N 21/23439; H04N 5/23245
See application file for complete search history.

(56) References Cited

U.S. PATENT DOCUMENTS

| | | | |
|---|---|---|---|
| 8,631,047 B2 | 1/2014 | Roenning | 707/803 |
| 8,768,142 B1* | 7/2014 | Ju | H04N 21/274 386/224 |
| 2008/0112683 A1 | 5/2008 | Lin et al. | 386/52 |
| 2008/0256574 A1 | 10/2008 | Lee et al. | 725/32 |
| 2010/0123796 A1 | 5/2010 | Sorensen et al. | 348/231.2 |
| 2013/0166711 A1 | 6/2013 | Wang et al. | 709/223 |

* cited by examiner

*Primary Examiner* — Huy T Nguyen
(74) *Attorney, Agent, or Firm* — Christopher P. Maiorana, PC

(57) ABSTRACT

An apparatus having a server is disclosed. The server may be configured to (i) receive via a network a first clip of video generated by a camera, (ii) receive via the network first information to edit the first clip, (iii) receive via the network one or more segments of a second clip of video generated by the camera as identified by the first information and (iv) create a third clip of video by editing the segments according to the first information. The second clip is generally a higher resolution version of the first clip. The third clip may have the higher resolution.

20 Claims, 5 Drawing Sheets

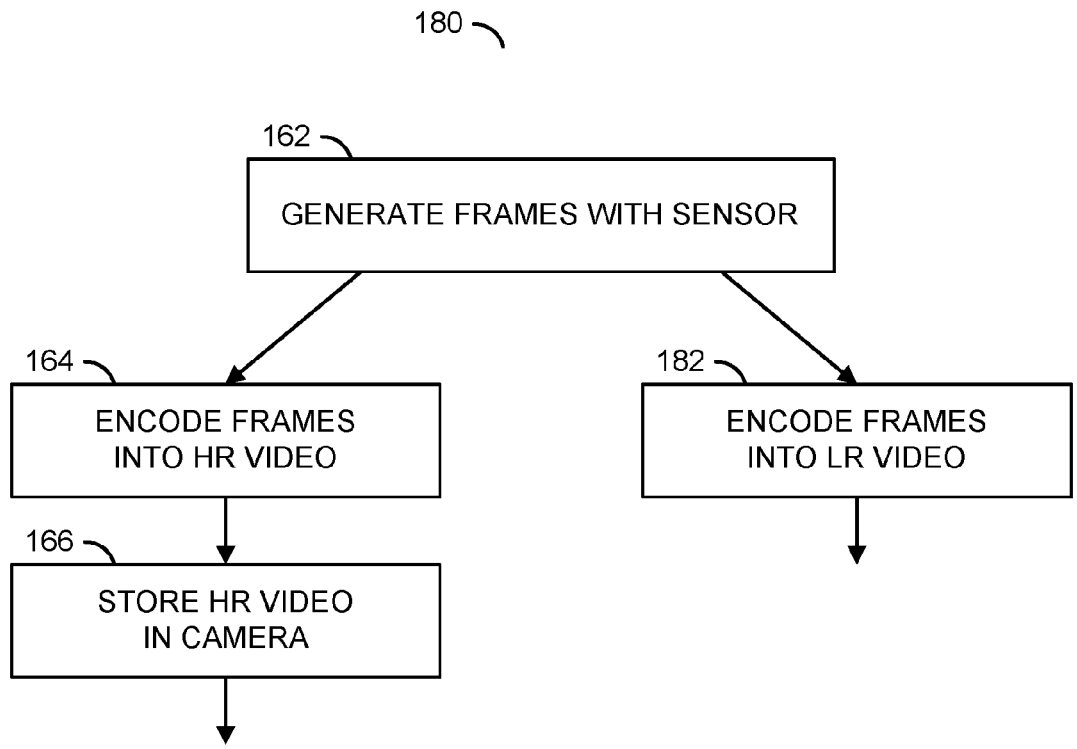

the appended claims and drawings in which:

VIDEO EDITING WITH CONNECTED HIGH-RESOLUTION VIDEO CAMERA AND VIDEO CLOUD SERVER

This application relates to U.S. Ser. No. 14/312,921, filed Jun. 24, 2014, which relates to U.S. Ser. No. 13/710,725, filed Dec. 11, 2012, now U.S. Pat. No. 8,768,142, which relates to U.S. Provisional Application No. 61/590,919, filed Jan. 26, 2012, each of which are hereby incorporated by reference in their entirety.

FIELD OF THE INVENTION

The present invention relates to video processing generally and, more particularly, to video editing with a connected high-resolution video camera and a video cloud server.

BACKGROUND OF THE INVENTION

Uploading high-definition (i.e., HD) video onto a video server commonly consumes a large amount of bandwidth, time and storage space at the video server. Consumer experience has shown that most of the HD video is not watchable if the HD video is not trimmed and edited. A conventional approach to resolving the bandwidth, time and space problem is to edit the HD video on a personal computer. Once the HD video authoring is complete, the HD video is uploaded onto the video server for sharing.

It would be desirable to implement video editing with a connected high-resolution video camera and a video cloud server.

SUMMARY OF THE INVENTION

The present invention concerns an apparatus having a server. The server may be configured to (i) receive via a network a first clip of video generated by a camera, (ii) receive via the network first information to edit the first clip, (iii) receive via the network one or more segments of a second clip of video generated by the camera as identified by the first information and (iv) create a third clip of video by editing the segments according to the first information. The second clip is generally a higher resolution version of the first clip. The third clip may have the higher resolution.

The objects, features and advantages of the present invention include providing an apparatus and/or method for video editing with a connected high-resolution video camera and a video cloud server that may (i) reduce a bandwidth consumed in transferring a high-resolution video to the server, (ii) reduce a time used to transfer the high-resolution video from the camera to the server, (iii) reduce storage of the high-resolution video in the server and/or (iv) create an edited high-resolution video clip in the server.

BRIEF DESCRIPTION OF THE DRAWINGS

These and other objects, features and advantages of the present invention will be apparent from the following detailed description and the appended claims and drawings in which:

FIG. 5 is a flow diagram of another example method to create both the high-resolution video clip and the low-resolution video clip; and FIG. 6 is a flow diagram of an example method for adding additional sound to the high-resolution video clip.

DETAILED DESCRIPTION OF THE PREFERRED EMBODIMENTS

Some embodiments of the present invention may utilize a camera capable of creating video clips (or programs or movies) at two different resolutions, a high-resolution (e.g., HR) and a low-resolution (e.g., LR). In some configurations, the camera may be capable of generating the video clips simultaneously at both resolutions. In other configurations, the camera may capture and store the HR (e.g., 1920×1080 pixels) video clip, and subsequently create a LR (e.g., 720×480 pixels or 420×240 pixels) version of the unedited HD content. The camera may use parsing information to parse the HR video clip into one or more HR video segments. Both the LR video clips and the HR video segments may be transferred (e.g., file transfers and/or streaming transfers) to a server across one or more networks.

Having the content of each video clip at both resolutions generally helps solve the common problems of network bandwidth, transfer time and server storage space. A combination of the camera and the server may facilitate uploading of the video clips to storage in a video cloud. At the same time, the combination may provide full resolution, watchable content without having to perform manual video editing on the camera. Editing of the video clips may leverage the processing and memory resources of the servers in the video cloud. The camera may be connected with a video cloud server without the intermediary of a conventional personal computer.

Figure 1:
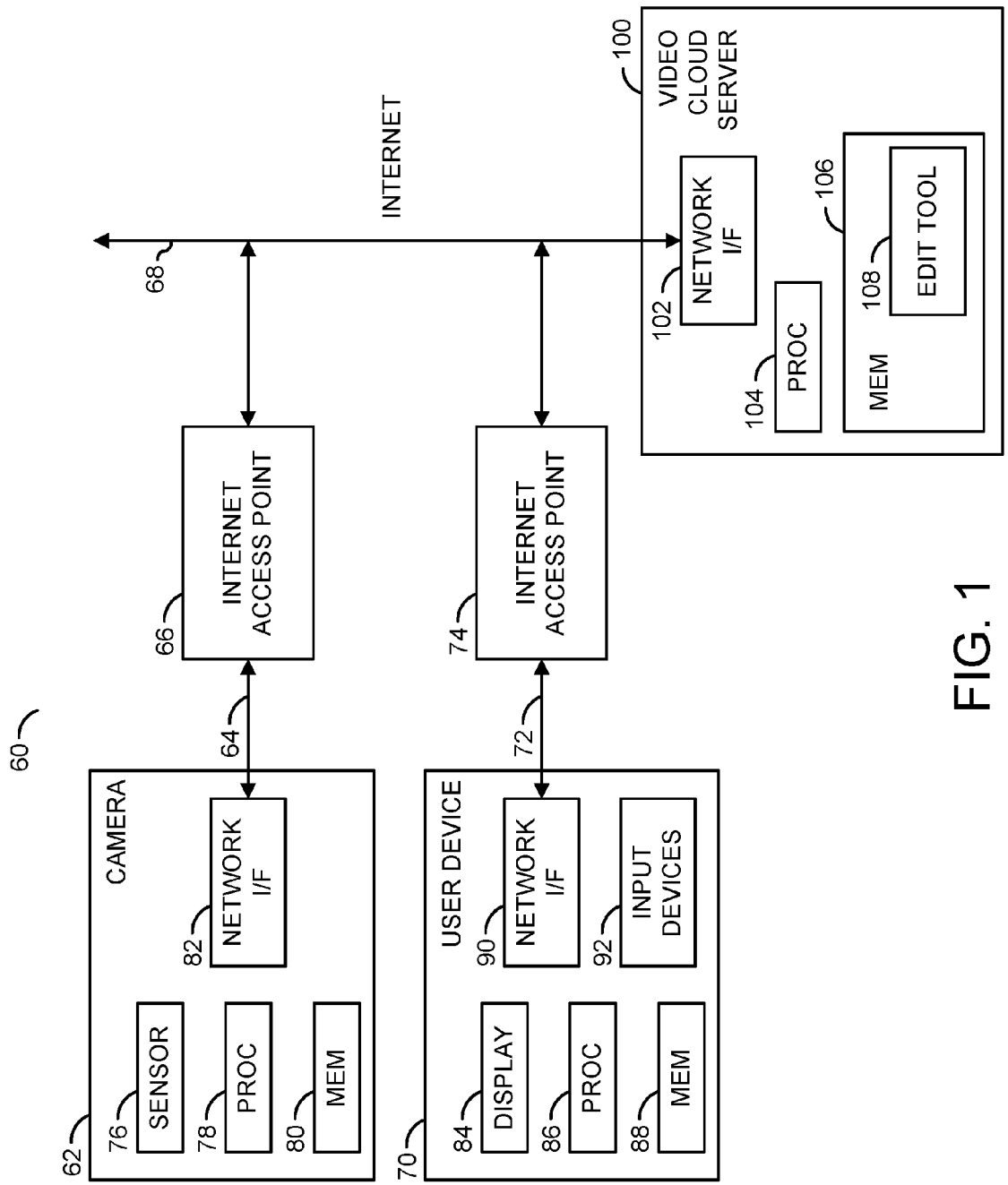
FIG. 1 is a block diagram of a system in accordance with a preferred embodiment of the present invention.

Referring to FIG. 1, a block diagram of a system 60 is shown in accordance with a preferred embodiment of the present invention. The system (or apparatus) 60 generally comprises a block (or circuit) 62, a network (or communications channel) 64, a block (or circuit) 66, a network (or communications channel) 68, a block (or circuit) 70, a network (or communications channel) 72, a block (or circuit) 74 and a block (or circuit) 100. The circuit 62 generally comprises a block (or circuit) 76, a block (or circuit) 78, a block (or circuit) 80 and a block (or circuit) 82. The circuit 70 generally comprises a block (or circuit) 84, a block (or circuit) 86, a block (or circuit) 88, a block (or circuit) 90 and a block (or circuit) 92. The circuit 100 generally comprises a block (or circuit) 102, a block (or circuit) 104 and a block (or circuit) 106. The circuit 106 may be configured to store a program (or software or code or instructions) 108. The circuits and networks 62-106 may be implemented in hardware, software, firmware or any combination thereof in multiple apparatuses (or devices).

The circuit 62 may be implemented as a high-resolution (or high-definition) video camera. The circuit 62 may be operational to capture one or more HR video clips using the circuit (e.g., an electro-optical sensor). The HR video clips may be processed (e.g., encoded) in the circuit 78 (e.g., a processor) and stored in the circuit 80 (e.g., a memory). The circuit 62 may also be operational to generate, process, encode (e.g., MPEG-2, H.264, etc.) and store one or more corresponding low-resolution (or low-definition) video clips. The circuit 62 may communicate with the circuit 66 through the circuit 82 (e.g., a network interface circuit) and the network 64. The network 64 may be implemented as one or more of a Wi-Fi network, an Ethernet, a wireless network and/or a wired network.

The low-resolution (e.g., LR) video clips may contain the same content captured at the same time from the same point of view as the corresponding HR video clips. In some embodiments, the LR video clips may be a downscaled copy of the HR video clips. In other embodiments, the LR video clips and the HR video clips may be captured in parallel. For example, each frame captured by the circuit 76 may be processed as HR video and processed as downscaled LR video.

The circuit 66 may implement an Internet access point circuit. The circuit 66 is generally operational to facilitate communications between the circuit 62 and the network 68. The circuit 66 may be a cable modem, a digital subscriber line modem, a telephone mode or other common modems.

The network 68 may be the Internet. The network 68 is generally operational to communicate the video clips and associated information among the circuits 62, 70 and 100. Other networks may be implemented to meet the criteria of a particular application.

The circuit 70 may implement one or more user devices. Each circuit 70 is generally operational to receive, decode and play video clips on the circuit 84 (e.g., video display or screen) that have been downloaded and/or streamed over the network 68. The circuit 70 may play both the HR video clips and the LR video clips. Sounds encoded in the video clips may also be played by the circuit 70. The circuit 70 may include a processing (e.g., decoding) capability in the circuit 86 (e.g., a processor), a storage capability in the circuit 88 (e.g., a memory) and receive inputs from a user via the circuit 92 (e.g., input devices, buttons, touch screens, etc.). The circuit 70 may communicate with the circuit 74 through the circuit 90 (e.g., a network interface circuit) and the network 72. The network 72 may be implemented as one or more of a Wi-Fi network, an Ethernet, a wireless network and/or a wired network. The circuit 70 may be, but is not limited to, one or more among cellular telephones, land-line telephones, personal digital assistants, personal computers, notebooks, laptop computers, tablets and hand-held video players. In some configurations, the circuit 70 may be part of the circuit 62. For example, the combined circuit 62/70 may be a tablet computer with a built-in high-resolution camera.

The circuit 74 may implement an Internet access point circuit. The circuit 74 is generally operational to facilitate communications between the circuit 70 and the network 68. The circuit 66 may be a cable modem, a digital subscriber line modem, a telephone mode or other common modems.

The circuit 100 may implement one or more video cloud servers. Each circuit 100 may be operational to receive via the network 68 the LR video clips generated by the circuit 62. The LR video clips may be stored within the circuit 100 and/or transferred across the network 68 to the circuit 70. The circuit 100 may also receive edit information from the circuit 70 and/or the circuit 62 via the network 68 explaining how to edit the LR video clips. The LR videos clips may be edited (authored) by the circuit 100 per the edit information to create LR preview video clips. The LR preview video clips may be transferred across the network 68 to the circuit 62 and/or the circuit 70 for viewing. Parsing information may also be created from the edit information by the circuit 100. The parsing information may be transferred across the network 68 to the circuit 62 where the corresponding HR video clip is parsed into one or more segments. The resulting HR segments may be transferred back to the circuit 100 via the networks 64 and 68. The circuit 100 may use the HR segments to create (author) an edited HR video clip by editing the HR segments according to the edit information. The edited HR video clip may subsequently be transferred to any other computer accessible across the network 68.

The edit information may comprise editing information, trimming information, audio information and information for other common video adjustments. The editing of the video clips and the segments may include, but is not limited to, adjusting the color, saturation and/or hue, parsing the video clips into the segments, synchronizing audio tracks (e.g., narrative voice, background music, etc.) to the video clips and/or segments, adding the synchronized sounds to the video, adjusting the sound volume and adding text and/or graphic overlays to the video for creating titles and/or other special effects.

The circuit 102 may implement a network interface circuit. The circuit 102 is generally operational to facilitate communications between the circuit 100 and the network 68. The circuit 102 generally provides translations and network protocols to communicate on the network 68.

The circuit 104 may implement a processor circuit. The circuit 104 is generally operational to execute software to process video and other data. The processing generally includes, but is not limited to, encoding, decoding, editing, trimming, color adjustments, audio editing, audio overlaying, graphics generation and graphic overlaying onto the video. The circuit 104 may be coupled to the circuit 102 to send and receive video and data to and from the network 68. The circuit 104 may also be coupled to the circuit 106 to access software programs (e.g., program 108), video clips/segments and other data.

The circuit 106 may implement a memory circuit. The circuit 106 is generally operational to store the software programs, the video clips/segments and the other data. The circuit 106 may include, but is not limited to, dynamic random access memory, read only memory, volatile memory, nonvolatile memory, disk drives, magnetic drives, optical drives and tape drives.

The program 108 may implement a video editing tool. The program 108 may be operational to convert the edit information into the parsing information. The program 108 may be operational to alter the LR video clips to create the LR preview video clips. The program 108 may also be operational to edit the HR video segments to create (author) the edited HR video clip. The editing may be performed according to the edit information received from the circuits 62 and/or 70. In some configurations, the program 108 may include an auto-editing capability. The auto-editing capability may automatically edit the LR video clips into a final form. The changes to an LR video clip caused by the auto-edit may be compiled into the edit information. In some configurations, the video editing (e.g., program 108) may be provided by third-party video editing software.

Figure 2:
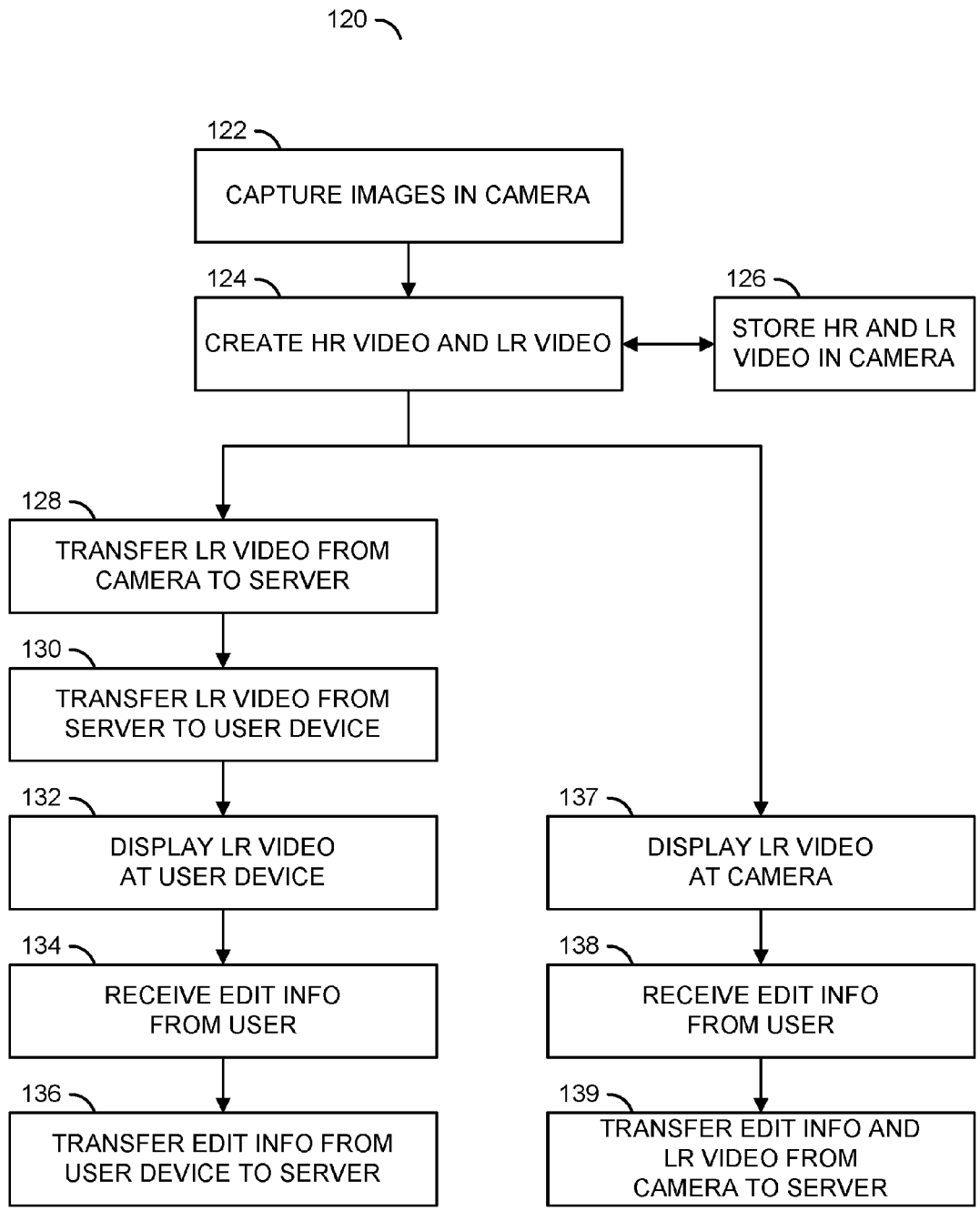
FIG. 2 is a flow diagram of an example method for editing a low-resolution video clip.

Referring to FIG. 2, a flow diagram of an example method 120 for editing an LR video clip is shown. The method (or process) 120 may be implemented in the system 60. The method 120 generally comprises a step (or state) 122, a step (or state) 124, a step (or state) 126, a step (or state) 128, a step (or state) 130, a step (or state) 132, a step (or state) 134, a step (or state) 136, a step (or state) 137, a step (or state) 138 and a step (or state) 139. The steps 122-139 may be implemented in hardware, software, firmware or any combination thereof in multiple apparatuses (or devices).

In the step 122, the circuit 76 may capture a series of images (or pictures or frames). The circuit 78 may process the captured images to create a HR video clip and a LR video clip in the step 124. The HR video clip may be stored in the circuit 80 in the step 126. In some configurations of the circuit 62, the circuit 78 may also process the images received from the circuit 76 in the step 124 to create the LR video clip from the same images used to create the HR video clip. Generation of the LR video clip may be performed in parallel to the generation of the HR video clip. In other configurations of the circuit 62, the circuit 78 may transcode the HR video clip previously buffered in the circuit 80 to create the LR video clip in the step 124. Once created, the LR video clip may be stored in the circuit 80 as part of the step 126. By way of example, the steps 122-126 may represent a user (or person) recording 10 minutes of an athletic event with the camera.

In some instances, the circuit 82 may transfer the LR video clip across the network 64 to the circuit 66 in the step 128. The circuit 66 may continue transferring the LR video clip across the network 68 to the circuit 102 where the LR video clip may be buffered in the circuit 106. The video may be transferred using a video streaming format or a video file (or container) format. The video streaming formats may include, but are not limited to a Real-time Transport Protocol (RTP), a Flash Video (FLV) format and MPEG-2 Transport Stream (TS) format. The video file formats may include, but are not limited to, an MP4 (e.g., MPEG-2 part 14) format, a MOV (e.g., QuickTime) format and a 3GP (e.g., Third Generation Partnership Project file) format. Returning to the example, the step 128 may represent the user uploading the 10-minute LR video clip from the camera to the video cloud server.

In the step 130, the circuit 102 may transfer the LR video clip from the circuit 106 across the network 68 to the circuit 74. The circuit 74 may relay the LR clip across the network 72 to the circuit 90. The circuit 86 may format the received LR video clip for display through the circuit 84 to a user of the circuit 70 in the step 132. The user watching the LR video clip may enter editing commands (or information) using the circuit 92 to initiate the generation of a LR preview video clip and a HR video clip into the final form. In the step 136, the circuit 86 may assemble the editing commands into an edit information file that is transferred back to the circuit 100. In the example, the steps 130-136 may represent the user downloading the 10-minute LR video clip from the video cloud server to a cellular telephone, or similar device, and entering edit commands to trim the clip down to two 1-minute clips.

In other instances, the circuit 78 may format the LR video clip for display to a user of the circuit 62 in the step 137. The user watching the LR video clip may enter the editing commands (or information) in the step 138. In the step 139, the circuit 78 may assemble the editing commands into an edit information file that is transferred to the circuit 100 along with the corresponding LR video clip. In the example, the steps 137-139 may represent the user viewing the 10-minute LR video clip on the camera and entering the edit commands into the camera to trim the clip down to the two 1-minute clips.

Figure 3:
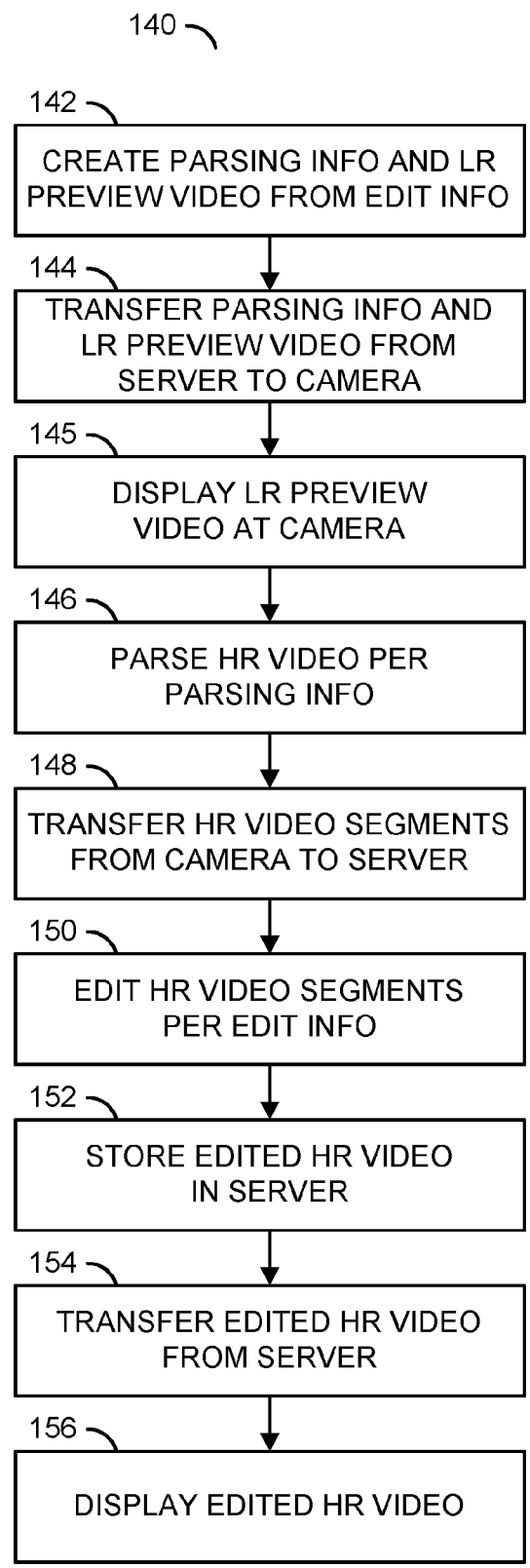
FIG. 3 is a flow diagram of an example method for creating a high-resolution video clip.

Referring to FIG. 3, a flow diagram of an example method 140 for creating a HR video clip is shown. The method (or process) 140 may be implemented in the system 60. The method 140 generally comprises a step (or state) 142, a step (or state) 144, a step (or state) 145, a step (or state) 146, a step (or state) 148, a step (or state) 150, a step (or state) 152, a step (or state) 154 and a step (or state) 156. The steps 142-156 may be implemented in hardware, software, firmware or any combination thereof in multiple apparatuses (or devices).

In the step 142, the circuit 104 may generate the parsing information from the edit information received from the circuit 70 and/or the circuit 62. The circuit 104 may also perform an editing function on the LR video clip received from the circuit 62 to generate a LR preview video clip based on the edit information and/or parsing information. The circuit 102 may transfer the parsing information and the LR preview video clip in the step 144 to the circuit 62 across the networks 68 and 64. In the step 145, the circuit 62 may display (play) the LR preview video clip to the user. Where the user indicates that the LR review clip is acceptable, the circuit 78 may parse (or divide) the HR video clip buffered in the circuit 80 into one or more HR video segments per the parsing information in the step 146. The parsing information may identify a respective beginning and a respective duration (or end) of each segment to be extracted from the HR video clip. The HR video segments may be transferred from the circuit 62 back to the circuit 100 in the step 148. Returning to the example started with FIG. 2, the steps 142-148 may represent the video cloud server creating and sending parsing information and the LR preview video to the camera, the camera playing the LR preview video and parsing the HR video clip into the two 1-minute HR video segments and the camera returning the HR video segments to the video cloud server.

In the step 150, the circuit 104 executing the program 108 may edit the HR video segments received during the step 148 to create an edited HR video clip. The editing may be performed under the direction of the edit information (e.g., an edit-trim list). The edited HR video clip may be stored in the step 152 into the circuit 106. The steps 150-152 may represent in the example a software video editing tool assembling, editing, trimming and manipulating the two 1-minute HR video segments received from the camera into a new 1-minute 55-second (e.g., 1:55) edited HR video clip.

The edited HR video clip may be transferred from the circuit 100 to any device (e.g., the circuit 70, a web server, a home computer, etc.) connected to the network 68 in the step 154. The device may display (play) the edited HR video clip in the step 156. In the example, the 1:55 edited video clip may be transferred to a web page owned by the user where the clip may be viewed by anyone visiting the web page.

Figure 4:
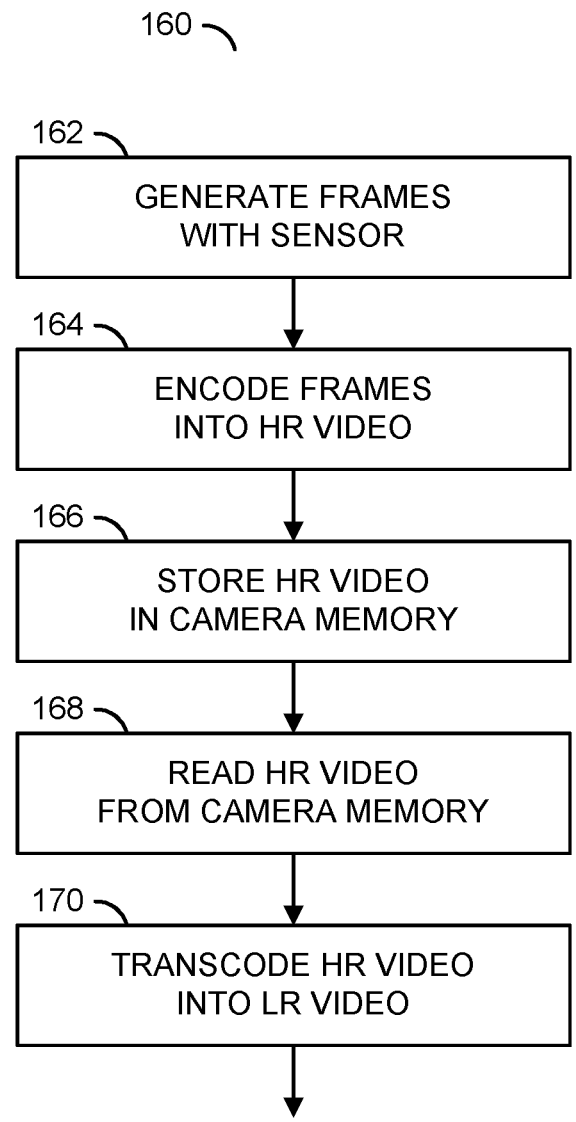
FIG. 4 is a flow diagram of an example method to create both the high-resolution video clip and the low-resolution video clip.

Referring to FIG. 4, a flow diagram of an example method 160 to create both the HR video clip and the LR video clip is shown. The method (or process) 160 may be implemented by the circuit 62. The method 160 generally comprises a step (or state) 162, a step (or state) 164, a step (or state) 166, a step (or state) 168 and a step (or state) 170. The steps 162-170 may be implemented in hardware, software, firmware or any combination thereof in an apparatus (or device).

In the step 162, the circuit 76 may capture an optical scene as a sequence of HR frames. The circuit 78 may encode (compress) the HR frames in the step 164 to generate the HR video clip. The HR video clip may be stored in the circuit 80 in the step 166.

While the HR video clip is being recorded or after the HR video clip is finished recording, the circuit 78 may read the HR video clip from the circuit 80 in the step 168. In the step 170, the circuit 78 may transcode the HR video clip into the LR video clip. The LR video clip may be stored back into the circuit 80 and/or transferred to the circuit 100 (e.g., FIG. 2 step 128).

Referring to FIG. 5, a flow diagram of another example method 180 to create both the HR video clip and the LR video clip is shown. The method (or process) 180 may be implemented by the circuit 62. The method 180 generally comprises the step 162, the step 164, the step 166 and a step (or state) 182. The steps 162-182 may be implemented in hardware, software, firmware or any combination thereof in an apparatus (or device).

The circuit 62 may record, process and save the HR video clip in the steps 162-166 in the same manner as shown in FIG. 4. Furthermore, the circuit 78 may process (downscale) the HR frames received from the circuit 76 to generate a sequence of LR frames in parallel with generating the sequence of HR frames. The LR frames may be encoded (compressed) into the LR video clip in the step 182 by the circuit 78. The LR video clip may be stored back into the circuit 80 and/or transferred to the circuit 100 (e.g., FIG. 2 step 128).

Referring to FIG. 6, a flow diagram of an example method 190 for adding additional sound to the HR video clip is shown. The method (or process) 190 may be implemented by the circuit 100. The method 190 generally comprises a step (or state) 192 and a step (or state) 194. The steps 192-194 may be implemented in hardware, software, firmware or any combination thereof in an apparatus (or device).

The circuit 104 may use the edit information to synchronize one or more additional audio tracks (e.g., narrative voice, background music, etc.) to the HR video segments received from the circuit 62 in the step 192. The synchronization may find one or more points in time where the user commanded the addition of an audio track to the full-length LR video clip to similar points in time within the HR video segments. The additional audio tracks may be stored within the circuit 100 (e.g., in the circuit 106), received from another computer on the network 86 (e.g., an audio cloud server), from the circuit 62 and/or from the circuit 70. In the step 194, the circuit 104 may add (or superimpose) the additional audio tracks to the HR video segments (e.g., part of the editing step 150 in FIG. 3).

The functions performed by the diagrams of FIGS. 1-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a server configured to (i) receive via a network a first clip comprising a plurality of images generated by a camera, (ii) receive via said network first information to process said first clip, (iii) transfer second information to said camera, (iv) receive via said network one or more segments of a second clip comprising a plurality of images generated by said camera as identified by said second information and (v) create a third clip comprising a plurality of images by processing said segments according to said first information, wherein (a) said second clip is a higher resolution version of said first clip and (b) said third clip has an alternate resolution.

2. The apparatus according to claim 1, wherein said server comprises a cloud server.

3. The apparatus according to claim 2, wherein said cloud server is configured to scale resources for said processing of said images.

4. The apparatus according to claim 3, wherein said resources for said processing of said images are scaled based on a demand.

5. The apparatus according to claim 3, wherein a cost is associated with said utilizing said resources for said processing of said images.

6. The apparatus according to claim 5, wherein said cost is based on a pay-as-you-go model.

7. The apparatus according to claim 1, wherein said processing of said images implements real time image processing.

8. The apparatus according to claim 1, wherein said processing of said images implements an image resizing.

9. The apparatus according to claim 1, wherein said processing of said images implements image cropping.

10. The apparatus according to claim 1, wherein said processing of said images performs an application of a filter to one or more of said images.

11. The apparatus according to claim 1, wherein said processing of said images performs an image compression.

12. The apparatus according to claim 1, wherein said alternate resolution is a resolution used to generate an image thumbnail.

13. A method for image editing comprising the steps of:
receiving at a server via a network a first clip comprising a plurality of images generated by a camera;
receiving at said server via said network first information to process said first clip;
transferring second information to said camera;
receiving at said server via said network one or more segments of a second clip comprising a plurality of images generated by said camera as identified by said second information; and
creating a third clip comprising a plurality of images by processing said segments according to said first information in said server, wherein (i) said second clip is a higher resolution version of said first clip and (ii) said third clip has an alternate resolution.

14. The method according to claim 13, wherein said server comprises a cloud server.

15. The method according to claim 13, wherein said processing of said images implements real time image processing.

16. The method according to claim 13, wherein said processing of said images implements an image resizing.

17. The method according to claim 13, wherein said processing of said images implements image cropping.

18. The method according to claim 13, wherein said processing of said images performs an application of a filter to one or more of said images.

19. The method according to claim 13, wherein said processing of said images performs an image compression.

20. A non-transitory computer readable medium containing processor executable instructions configured to perform the steps of:
receiving via a network a first clip comprising a plurality of images generated by a camera;
receiving via said network first information to process said first clip;
transferring second information to said camera;
receiving via said network one or more segments of a second clip comprising a plurality of images generated by said camera as identified by said second information; and
creating a third clip comprising a plurality of images by processing said segments according to said first information, wherein (i) said second clip is a higher resolution version of said first clip and (ii) said third clip has an alternate resolution.

* * * * *